2,786,800
MAKE-UP CATALYST ADDITION IN A HYDROCARBON CONVERSION PROCESS

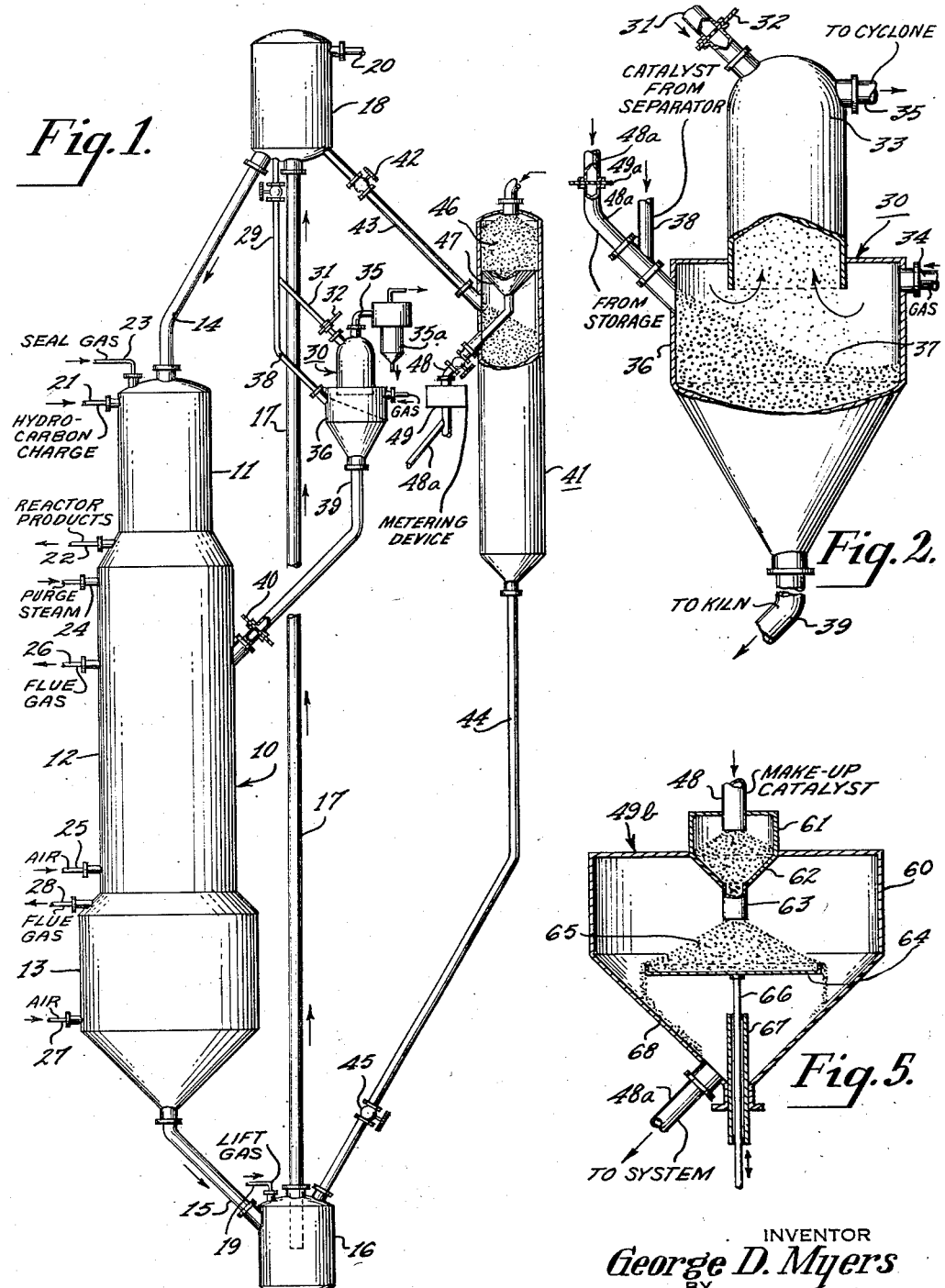

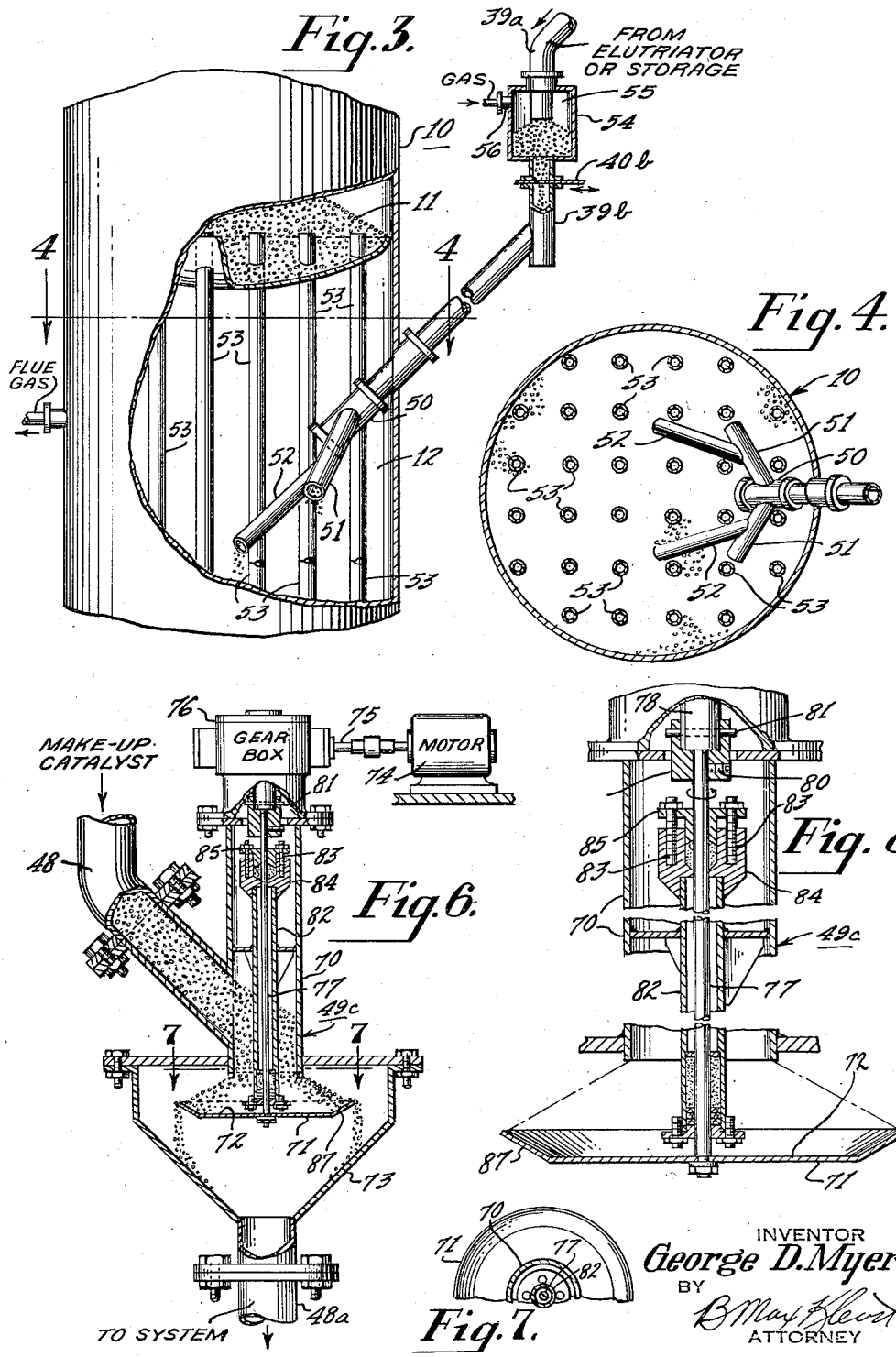

George D. Myers, Ashland, Ky., assignor to Houdry Process Corporation, Wilmington, Del., a corporation of Delaware Application June 26, 1951, Serial No. 233,591

7 Claims. (Cl. 196—52)

The present invention relates to moving compact bed hydrocarbon conversion systems employing granular catalyst or other porous or adsorbent contact mass, and is particularly concerned with the addition of regulated quantities of such contact mass to a circulating body thereof, generally to replace removed portions.

In such systems the granular contact mass, which may be catalytic, descends through a downflow path as a compact bed or beds through one or more fluid contacting zones, and at the bottom of the downflow path the granular mass is raised to an elevated position for repetition of its downward movement. In typical hydrocarbon conversion systems, the fluid contacting zones will ordinarily comprise principally a hydrocarbon connversion zone wherein the granular mass is contacted with hydrocarbon charged, and a regeneration or heating zone, wherein, for instance, the granular mass containing coke deposit, is subject to contact with oxygen-containing gas for effecting combustion of the coke. In systems of this type it is generally found necessary to add a minor quantity of contact mass to the circulating body thereof, which in part at least is to replace that portion removed as fines resulting from attrition; or if the granular mass is catalytic and attrition is extremely small, a portion of the mass may be removed in granular form to permit replacement thereof by fresh catalyst or catalyst of higher activity in order to maintain desired equilibrium activity. The present invention is particularly concerned with improvements in the manner of adding so-called "make-up" catalyst or other contact mass requiring replacement in the system. Since the problems encountered are more acute in the case of the more costly contact mass which is catalytically active, the addition of make-up catalyst is particularly referred to in the description which follows; it being understood, however, that the invention is not thereby limited and is applicable in connection with the addition of non-catalytic contact material to replace that lost through attrition or otherwise.

In circulating systems of the type under discussion, the catalyst or other contact mass is maintained at or subjected to elevated temperatures in the order of 800° F. and above. One of the major problems currently encountered in such systems is that resulting from attrition of the catalyst, particularly in those systems employing a gas lift for elevation of the catalyst to the top of its downflow path during the course of circulation. The factors contributing to total attrition in the system are many and various. It has now been found that a considerable portion of the total attrition arising during operation may occur as a result of the prevailing manner of adding make-up catalyst thereto.

In the earlier systems, still in current use, employing bucket elevators or the like for the transportation of catalyst to elevated position, it has been and is the practice to withdraw fresh catalyst from storage periodically and add the same to the elevator carrying coke-containing catalyst, discharged from the hydrocarbon reactor, to the top of the regenerating kiln; the fresh catalyst or a portion thereof is sometimes subjected to a separate heating step by contact with heated air or other hot gas before being so added. With the adoption of the gas lift to replace the mechanical elevators previously employed, similar arrangements for the addition of make-up catalyst have been utilized. That is, the make-up catalyst is added batchwise over a comparatively short period of one to several hours, so that during the period of such addition there may be initially introduced into the circulating mass a localized concentration of catalyst differing in temperature, in activity, or in some other respect, from the existing general mass of catalyst that is being continuously circulated in the system; often giving rise to erratic operation and/or irregularities in flow, chiefly evidenced by serious afterburning in flue gas lines or elsewhere, insufficient heating of the catalyst in the kiln which subsequently may be reflected in the reactor by condensation of hydrocarbon liquid on the catalyst or absorption of unconverted oil therein, abnormal coke deposition, or interference generally with the normal operation of the kiln and the maintenance of desired heat balance.

In the operation of units employing a gas lift, following the previous practice employed with systems having mechanical elevators, the make-up catalyst has at times been introduced into the circulating system by way of the catalyst hopper at the foot of the gas lift. By such operation additional problems are encountered as a result of the pressure differential between the lift hopper and the source from which the make-up catalyst is being fed thereto. Because such pressure differential entails an adverse pressure gradient in the catalyst line supplying the lift hopper, which may sometimes lead to or augment hold-up in catalyst flow, under these conditions there may be abnormally large slugs of cooler catalyst or of catalyst differing in other respects from that of the main circulating mass, admitted suddenly into the system with serious consequences evidenced by abnormally high attrition and otherwise, which may in part account for previously unexplained or unrecognized difficulties experienced in operation.

In typical systems of the mechanical elevator type, when employing clay catalyst and circulating catalyst at the rate of approximately 100 tons per hour, the catalyst make-up rate may be in the order of 2 to 3 tons per day, which in practice is added batchwise, often daily or somewhat more frequently, and generally over a period of not more than several hours. Under these conditions, during the make-up period, there may be present in the circulating mass of catalyst entering the kiln in the order of ⅔% to 1.5% of freshly added make-up catalyst, and in units employing a gas lift of a size having a typical catalyst circulation rate of about 200–250 tons per hour, even in the case of hardier or more resistant gel bead catalyst, the percentage of fresh make-up catalyst in the circulating mass is of about the same order.

It has now been found that smoother operation, giving rise to lower rates of attrition and improved over-all performance in circulation of catalyst and operation of the system is obtained, if the required make-up catalyst is added continuously to the circulating catalyst mass in the system or at least gradually and over a more extended period. In general, in accordance with the invention, novel arrangements are provided for gradual addition of make-up catalyst at a fairly uniform rate such that at any given time the amount so added provides a concentration of make-up catalyst in the circulating catalyst mass of substantially less than 0.5% and preferably less than 0.25% thereof. Moreover, the catalyst is added to the circulating mass at suitable locations and in a manner enabling better control of uniformity of flow, avoiding many, if not all, of the difficulties previously encountered.

The operation of the invention and other advantages thereof will be appreciated from the description which follows, read in connection with the accompanying drawings illustrating several embodiments by which the principles of the invention may be practiced.

In these drawings: Figure 1 is largely schematic view in elevation, of a hydrocarbon conversion system provided with a gas lift.

Figure 2 is an enlarged fragmentary view in elevation of the elutriator section embodying a modified arrangement, portions being broken away to show internal structures.

Figure 3 is a fragmentary view in elevation of another portion of the system showing one form of control in the conduit carrying make-up catalyst to the top of the kiln.

Figure 4 is a horizontal cross section taken on the line 4—4 of Figure 3.

Figure 5 is a fragmentary view in elevation of a modified embodiment showing one form of mechanical feeding device for adding make-up catalyst to the system.

Figure 6 is a view similar to that of Figure 5 showing a further modification of a mechanical feeding device for the same purpose.

Figure 7 is a partial horizontal cross section taken on the line 7—7 of Figure 6, and Figure 8 is an enlarged view of a detail shown in Figure 6.

Referring now more particularly to Figure 1, there is shown a unitary vessel 10 provided with three sections of progressively increasing diameter downwardly, and comprising principally a reaction zone 11 in the uppermost and narrowest section, an upper kiln section 12 and a lower kiln section 13 in the intermediate and bottom sections of vessel 10 respectively. A catalyst inlet conduit 14 communicates with the top of section 11 and a catalyst discharge conduit communicates with the bottom of section 13 at one end thereof and with a catalyst lift hopper 16 at the other end thereof. Arising substantially vertically through the top of hopper 16 is a lift pipe 17 extending to a level above the top of vessel 10 and entering through the bottom of a gas/solids separator or disengager hopper 18.

In operation, catalyst discharged from the lowermost zone of the kiln section 13 descends as a compact column through conduit 15 into transfer hopper 16 forming a bed therein. Introduction of a lift gas into hopper 16, as by a supply line 19 or in other manner known to the art (see "New Houdriflow cracking unit," Petroleum Processing, June 1950, beginning at page 601), effects elevation of the catalyst from the bed in hopper 16 into and through lift pipe 17. The catalyst and lift gas is discharged into separator 18, wherein the gas is withdrawn overhead as by means of a line 20 while the catalyst is principally discharged at the bottom of the separator through conduit 14 to repeat the cycle.

In its downflow path and while descending as a compact mass through the vessel 10, the catalyst is engaged in the reactor section 11 with hydrocarbon charge, which is thereby converted in contact with the catalyst, the charge being introduced through one or more supply lines 21, in vapor, liquid or mixed phase.

Conversion products are disengaged from catalysts at the bottom of the reactor section and discharged through a line 22 to further processing or appropriate fractionation equipment not shown. Means are provided for the introduction of seal gas, such as steam, into the top of the reactor at 23, a portion of which gas flows upwardly through conduit 14 and maintains a pressure seal therein in known manner.

The catalyst containing hydrocarbonaceous deposit or "coke" accumulated as a result of hydrocarbon conversion reactions in section 11, in its further descent through vessel 10 passes through a purging zone wherein it is contacted with steam or other purge gas admitted through line 24 and the purged catalyst then passes through one or more seal pipes into the top of the regenerator section 12. One form of arrangement of such seal pipes is shown in Figures 3 and 4. In the regenerator or kiln section 12, the coke-containing catalyst gravitating therethrough as a compact bed, is contacted with countercurrently flowing regenerating gas, which may be air or other oxygen-containing gas, admitted at the bottom of that section through a supply line 25, combustion products being withdrawn at the top of section 12 as flue gas through a discharge line 26. The flue gas may be sent to a discharge stack or all or a portion thereof may be utilized as desired or required in other portions of the system.

In the lower regenerating section 13 the catalyst is subjected to a subsequent stage of regeneration by countercurrent contact with regenerating gas admitted at the bottom of that section by a supply line 27; flue gas being discharged at the top of that section through line 28, which gas may be disposed of in a manner similar to that described for the flue gas discharged through line 26. The regeneration may be carried out in more than the illustrated two stages by the provision of additional sections similar to section 12. Appropriate heat exchange devices (not shown) may be provided in the regenerator sections or therebetween to control maximum temperature.

To withdraw dust and particles of less than smallest desired size from the system, a predetermined portion of the catalyst discharged into separator 18 is by-passed through a line 29 into an elutriating device shown generally at 30. In the operation of this device, as shown in Fig. 1, the catalyst from the line 29 enters the elutriator through a branch line 31 at a predetermined rate under the control of an orifice plate, slide valve or other flow regulating device 32.

Referring now more particularly to Fig. 2 wherein the elutriator proper is shown enlarged, it will be seen that the line 31 will discharge into the upper section 33 of the elutriator as a freely falling stream of particles traversed in section 33 by countercurrently flowing gas admitted into the bottom of that section through supply line 34. The gas passing upwardly through the elutriator section 33 picks up dust and the more finely divided particles, which are discharged with the gas through the line 35 into a cyclone 35a (Fig. 1) or other device for removing the fine particles from the gas. The coarser particles discharge from the upper elutriator section 33 into an enlarged hopper 36 therebelow to form a compact bed therein maintained at a level, as indicated at 37, spaced below the bottom of the narrower elutriator section 33. This bed level is maintained regardless of the amount of catalyst entering the elutriator through line 31 by a separate supply of catalyst to the hopper 36 as will hereinafter be explained. Referring again to Fig. 1, it will be seen that the hopper section 36 is supplied directly by a branch line 38 communicating with line 29 so that irrespective of the amount of catalyst entering the elutriator through line 31 under the control of device 32, the bed level in hopper 36 is maintained substantially constant, since the flow of catalyst thereinto through line 38 is controlled by the rate that catalyst is discharged from the bottom of hopper 36.

From the hopper 36 the recovered coarser particles of catalyst, freed of fines in the elutriator, are returned to the system as by means of a discharge line 39 communicating with any appropriate point of the main circulating catalyst system. In the embodiment shown in Fig. 1, discharge line 39 communicates with a catalyst free space provided above the catalyst level in regenerating section 12 of the vessel 10. Details of distribution of the catalyst in the kiln section, in accordance with a preferred embodiment, are shown in Fig. 3. The rate of addition of catalyst to kiln section 12 and accordingly the rate of withdrawal of the catalyst from the hopper 36 is controlled by an orifice plate, chopper valve or other flow control device 40; which, it will be understood, is designed or adjusted to permit the passage of catalyst therethrough at a rate slightly in excess of the rate at which catalyst can pass through the control device 32 in line 31. The difference in the rate of flow of catalyst through the device 32 and the device 40 is made up by the amount of catalyst that will be passed into the hopper 36 through the branch line 38, and/or by catalyst entering the line 39 above restriction 40 from some other source.

A storage hopper 41 is provided adjacent the catalyst circulating system described, into which catalyst from the separator 18 may be withdrawn during a shut-down period or the like, by opening valve 42 in line 43 connecting the separator with the storage hopper 41. Catalyst from the storage hopper 41 is returned to the system through a line 44 communicating with the lift transfer hopper 16 by opening valve 45.

The storage hopper 41 is partitioned at the upper part thereof to provide a separate storage section 46 therein for temporarily retaining make-up catalyst to be added to the system. The partitioned storage section 46, as shown in Fig. 1, is provided with a funnel-shaped bottom 47 communicating with a discharge line 48 through which make-up catalyst is supplied to the main stream of circulating catalyst in the system, the make-up catalyst being added at any appropriate point. One convenient manner of adding the make-up catalyst is to bring the same into the line supplying catalyst from the elutriator to the system, which may be accomplished by discharging line 48a, communicating with line 48, into line 39 in appropriate manner. Between line 48 and communicating line 48a, a flow regulating, controlling or metering device 49 is provided as more fully explained below.

Another convenient and preferred manner of adding the make-up catalyst is illustrated in Fig. 2 wherein line 48, carrying the make-up catalyst, discharges directly into the enlarged hopper section 36 of the elutriator 30. In this modification, branch line 38 carrying catalyst from the separator 18 and line 48a carrying the make-up catalyst from supply hopper 46 are joined as a Y or other suitable connection. The flow controlling device 49 in line 48 is shown here in simplest form as a slide valve or orifice plate 49a (Fig. 2), located above the connection of lines 48a and 38.

As hereinbefore explained, in order that desired efficient operation of the system be maintained, it is important that the make-up catalyst be added in regulated comparatively small amounts substantially uniformly over a continuous or relatively long period. The desired regulated addition of the make-up catalyst can be accomplished in various ways in accordance with the invention. The flow metering device, such as that diagrammatically indicated at 49 (Fig. 1), should be one capable of feeding the catalyst in well regulated and fairly uniform small quantities. In some instances, sufficiently well regulated control of flow of the rate of make-up catalyst can be had through a simple orifice plate or chopper valve, which is arranged as shown for instance in Fig. 3, and as hereinafter explained.

As illustrated in Figure 3, the catalyst admitted to regenerator section 12 of vessel 10 enters a manifold 50 provided with branches 51 and communicating distributing pipes 52 discharging catalyst into section 12 above the bed of catalyst therein, which bed is supplied by the catalyst feeding seal pipes 53 withdrawing catalyst from the reactor section 11 at their upper ends. The manifold 50 is supplied with make-up catalyst coming directly from the make-up catalyst storage hopper or with a mixture of make-up catalyst and the elutriated catalyst, freed of fines, being returned to the system. Thus, in accordance with the embodiment illustrated in Figure 2, catalyst is discharged through line 39 from hopper 36, including make-up catalyst brought into that hopper from storage through line 48 and catalyst coming from the separator 18 through lines 31 and 38. Line 39a (Fig. 3), thus, may carry only make-up catalyst supplied thereto through line 48 or 48a (Fig. 1) or a mixture of fresh make-up and elutriated catalyst from line 39 (Fig. 2). It has been found that the location of a flow-restricting device such as an orifice plate, slide valve, or chopper valve, in a sloping solids-conveying line, often leads to erratic and uncontrolled flow of solids therethrough, particularly if there is any flow of gas through the restricting device in opposite direction to the solids. Furthermore, as a result of temporary stoppage in flow in such lines from various causes followed by a subsequent breakthrough, comparatively large slugs of uncontrolled amounts of catalyst often take place. Such temporary holdup in flow is frequently due to condensation of moisture in the catalyst supply line during periods that make-up catalyst is not being supplied to the system and the line below the orifice plate or other flow control device is emptied when the shutoff valve is closed. Such condensation moisture creates a block in the line by the formation of a sludge or mud with fine particles in the line holding up flow at first, which may be followed by a subsequent breakthrough of the solids, passing a comparatively large and uncontrolled slug of catalyst into the main circulating system.

By the arrangement illustrated in Figure 3, these problems of erratic catalyst addition to the system are largely overcome as hereinafter explained. In the first place the catalyst flow control device, corresponding to 40 in Figure 1, is not placed across a sloping section of pipe but is located in a vertical section of the line as indicated at 39b. The catalyst in line 39a discharges into an enlarged section 54, the pipe 39a entering into that section to a level below the top thereof, thus providing a solids free space 55 above the bed of catalyst in the enlarged section. Gas is supplied to the solids-free space 55 by a line 56 in small amounts, being bled through a throttle valve for instance, providing a positive flow of gas through the orifice plate 40b and assisting flow of catalyst through the orifice, or at least overcoming any adverse pressure gradient that would otherwise be had by flow of gas therethrough in the opposite direction. The gas supplied to line 56 may be flue gas by-passed from the kiln section 12, or it may be air or other gas from an extraneous source, provided that the gas is not incompatible in the zone into which it is discharged with the catalyst in line 39. Although it is preferred that the pressure of the gas brought in through line 56 be slightly higher than the pressure at the discharge end of the catalyst supply line feeding the system, so that a positive downward flow of gas through the orifice is maintained, it may sometimes be found convenient to supply gas from the vicinity of catalyst discharge into the main circulating system (such as from above the catalyst bed in zone 12 of Figure 3), thus at least overcoming any adverse pressure gradient that would otherwise be had, tending to oppose flow of catalyst through the orifice. Positive flow of gas concurrently with the catalyst through the orifice is advantageous, since it serves to maintain a fairly uniform feed of catalyst through the restriction, such as at 40b, during periods that catalyst is flowing through line 39a and tends to prevent catalyst holdup due to bridging in the line. Moreover, during periods, if any, that the flow of catalyst in line 39a is discontinued, the continued flow of gas through that line prevents the entry of gas therein upwardly from the kiln section 12, thus avoiding the possible ill-effects of condensation of moisture from wet gas in the line.

While the problem of controlling the uniform rate of addition of catalyst is perhaps more serious as to adding fresh and particularly cooler make-up catalyst to the system, wherein the adoption of the arrangement shown in Figure 3 (or other flow control devices hereinafter described) is especially beneficial, it will be found advantageous to arrange the orifice plates or other flow restrictions in vertical catalyst conducting lines wherever such restrictions are needed or used, so that not only the orifice plate 40 (Figure 1) is so arranged but also other such plates or control valves, such as 32 in line 31 and 49a in line 48 (Figure 2). In addition to such arrangement of the flow-restricting orifices or valves in vertical catalyst conducting lines it is also considered advisable to provide for the introduction of gas into the line above the orifice as already explained.

In the embodiment shown in Figure 5, a different type of catalyst feeding or metering device 49 is employed designated 49b. Here the catalyst from storage hopper 46, is passed by line 48 into a mechanical feeding device arranged in housing 60. The catalyst is discharged from line 48 initially into a small hopper or chamber 61 at the upper end of housing 60 and passes out of the bottom of chamber 61 through a funnel shaped bottom 62 communicating with a short discharge nipple 63. The bottom or outlet of nipple 63 is spaced a suitable distance above a vertically reciprocating feed table 64 of sufficient diameter such that the table at the upper end of its stroke will support a pile of catalyst indicated at 65, accumulated on the table and retained thereon at the angle of repose of the catalyst, spilling over the edge of the table only when the latter is moved. The table is actuated by a rod 66 mounted in a sleeve 67 for vertical movement therethrough, which rod is reciprocated by a cam mechanism or other suitable drive means (not shown). When the table 64 is thus actuated by the rod 66 a portion of the catalyst thereon will spill over the edge of the table and onto the sloping wall forming the funnel-shaped bottom 68 of housing 60. The catalyst runs to the bottom of the funnel-shaped section 68 and is discharged therefrom through line 48a by means of which it is sent to the principal stream of circulating catalyst, as already explained. Thus, by vertically reciprocating the feed table 64 in regular timed sequence, controlled amounts of catalyst can be supplied to the main circulating body thereof in the system.

In Figures 6–8 another form of mechanical feeding or metering device 49 is shown designated 49c. Here catalyst from line 48 which consists of or comprises makeup catalyst, is brought into a vertical feed conduit 70, which latter discharges onto a rotating disk or table 71. The upper surface 72 of table 71 is of such diameter and is spaced vertically from the bottom of feed conduit 70 at a suitable distance such that when the table is stationary catalyst will pile up on the table at its angle of repose, and no catalyst will flow over the edge of the table. By rotating the table and thus disturbing the pile, catalyst is caused to flow over the edge of the table onto the sloping surface 73 forming a funnel shaped hopper below the table, which hopper discharges into the line 48a carrying catalyst to the main circulating system. The rate of catalyst flow over the edge of the table can thus be regulated or adjusted by the angular velocity of the table. To obtain the desired flexibility of operation the table is driven through suitable gearing by a varidrive motor 74 suitably mounted or supported over the housing enclosing the table.

As illustrated in Figure 6, the motor shaft 75 connects with a transmission including a vertical gear reducer (not shown) contained in the housing or gear box 76 by means of which the shaft 77 attached to table 71 is actuated. Referring now to Figure 8 where certain details of the housing for the shaft are shown enlarged, a vertical drive shaft 78 associated with transmission 76 is connected to the table-actuating shaft 77 by means of a coupling 79 attached to shaft 77 by a set screw 80 and to shaft 78 by pin 81. The shaft 77 passes through a sleeve or housing 82 which has associated therewith a bearing member 83 in which shaft 77 is journaled. Any desired form of bearing may be employed. In the illustrated embodiment the lower portion of the bearing is fixedly attached to the sleeve 82 and is formed with a recess therein for suitable packing means 84 pressed by a follower 85 through a screw-threaded connection therewith. The packing 84 may be of any suitable low friction material such as of the babbitt or graphite type. The lower end of shaft 77 is journaled in a bearing member 86, also suitably packed or provided with low friction surface surrounding the shaft.

Although a flat rotating disk may be employed as the feed table, it is preferred to form the same as a dish having an upright or outwardly sloping ledge as indicated at 87.

The use of a positive mechanically moved feeding device such as is illustrated in Figure 5, or preferably of the rotating type illustrated in Figure 6, is particularly advantageous for adding small controlled amounts of catalyst to the circulating catalyst system. It has been found that the use of a stationary metering device such as an orifice plate or slide valve provides serious difficulties in obtaining uniform flow of catalyst, under most favorable practical conditions, at rates below about 1500 pounds per hour, and is generally not entirely dependable at rates below 1.5 to 2 tons per hour. Accordingly, in units or operations wherein the make-up catalyst is added at rates of less than about 1500 pounds per hour, during the period of addition, it is particularly advantageous to employ a positively moving mechanical type of catalyst feeder.

In arrangements such as is shown in Figure 2 wherein the fresh make-up catalyst, which may be relatively cool, is added to the elutriated catalyst freed of fines and being returned to the system, such make-up catalyst is well distributed in the system in being initially admixed with the used catalyst from the elutriator and then supplied as such admixture to the main body of circulating catalyst in the system, thus further avoiding any tendency to form a localized concentration of the fresh make-up catalyst approximate the vicinity of its introduction into the system. Moreover, by adding the make-up catalyst to the elutriator, the relatively cool make-up catalyst, often containing pick-up moisture, is preheated therein under conditions less likely to cause thermal shock thereto with attendant weakening of the physical structure of the catalyst, than in cases where the fresh make-up catalyst is added directly to a regeneration zone, or to certain other places in the system in which the catalyst would encounter conditions effecting more rapid or more drastic heating. Since the quantity of elutriated catalyst being constantly returned to the system is relatively large as compared with the amount of fresh make-up catalyst supplied to the system, a fixed orifice or control valve properly arranged as shown for instance in Figure 3, is usually adequate for controlling the supply of the elutriated catalyst or of the admixture of elutriated and make-up catalyst to the system. The use of a mechanically operated metering device (such as that illustrated in Figures 6 to 8) is preferred, however, for obtaining greater uniformity of feeding of the make-up catalyst directly to the system or to the flowing body of elutriated catalyst for admixture therewith, and particularly where the make-up catalyst is to be added at rates less than about 1500 pounds per hour during the make-up period. In systems wherein the required quantity of make-up catalyst is small, as in the order of less than 0.5% per day of the total inventory of the catalyst in the circulating system, it may be found more practical to add such make-up catalyst at selected intervals rather than continuously, but even under these circumstances the catalyst should be added gradually and uniformly during such period of addition, and in no event should the total quantity of make-up catalyst added during the interval be put in over a period less than that required for one complete cycle of circulation of the total catalyst in the system.

Obviously many modifications and variations of the invention as hereinbefore set forth may be made without departing from the spirit and scope thereof and, therefore, only such limitations should be imposed as are indicated in the appended claims.

I claim as my invention:

1. In a hydrocarbon conversion system wherein granular catalyst is continuously circulated in compact bed form through a downflow path including a hydrocarbon conversion zone and a catalyst regeneration zone, and returned to a level above both of said zones for subsequent gravitational flow through said zones, the method which comprises withdrawing from said level as a side stream a minor portion of the circulating catalyst including fines, elutriating fines from the portion so withdrawn, and returning the remainder of the portion thus freed of fines to said downflow path by gravity flow; maintaining the total inventory of catalyst circulated through said downflow path substantially constant by replacing the quantity of fines with make-up granular catalyst, such make-up granular catalyst being added over a major portion of a cycle of continuous catalyst circulation and at a controlled rate such that the replacement catalyst thus added provides a substantially uniform concentration thereof in the continuously circulating body of catalyst passed through said downflow path of less than 0.5% by weight, said replacement catalyst being combined with said elutriated catalyst freed of fines, prior to returning said elutriated catalyst to the main circulating body of catalyst in said downflow path.

2. The method according to claim 1 wherein said combined replacement catalyst and elutriated catalyst are returned to a supply zone in said downflow path which zone has a higher pressure than that existing at said level of withdrawal of the side stream, and a pressure seal is maintained between said level of withdrawal and said supply zone through a substantially compact column of the catalyst flowing to said supply zone.

3. The method according to claim 2 wherein gas is passed downwardly through said compact column to oppose admission of gas to said column from said supply zone.

4. The method according to claim 2 wherein elutriation of fines from the side stream is effected in an elutriation zone and said compact column of the catalyst flowing to said supply zone is supplied by a compact bed of catalyst maintained at a constant bed level and receiving elutriated catalyst freed of fines in said elutriation zone, said compact bed being maintained at constant level, at least in part, by admission of the replacement catalyst to said compact bed.

5. The method according to claim 1 wherein the flow of catalyst is maintained at the required rate by flowing the catalyst through a vertical path to form a supported pile maintained at the angle of repose of the catalyst and moving the pile at a uniform rate to cause particles of catalyst to drop from said pile at the required controlled rate for subsequent passage to the recirculating main body of catalyst in said system.

6. The method according to claim 1 wherein the flow of catalyst is maintained at the required rate by flowing the catalyst through a vertical path to form a supported pile maintained at the angle of repose of the catalyst, and rotating the pile at a uniform rate to cause particles of catalyst to be centrifugally removed from said pile at the required controlled rate for subsequent passage to the recirculating main body of catalyst in said system.

7. The method according to claim 1 wherein the control of the rate of addition of granular make-up catalyst is effected by passing such catalyst downwardly through a path including a substantially vertical section in said path, restricting flow of catalyst in said vertical section to obtain the required controlled rate by passing the catalyst through a fixed orifice of restricted size, and supplying gas to said vertical section at a point directly above said orifice to provide a pressure on the upstream side of said orifice at least equal to the pressure on the downstream side of said orifice.

References Cited in the file of this patent

UNITED STATES PATENTS

| | | |
|---|---|---|
| 2,423,813 | Lechthaler et al. | July 8, 1947 |
| 2,432,822 | Secor | Dec. 16, 1947 |
| 2,567,207 | Hoge | Sept. 11, 1951 |
| 2,656,306 | Bergstrom | Oct. 20, 1953 |
| 2,704,740 | Oblad et al. | Mar. 22, 1955 |

OTHER REFERENCES

Measurement of Solids in T. C. C. Process, by Kelly Petroleum Eng., September 1945, pages 136, 138, 142.

Houdriflow, "New Design in Catalyst Cracking," Gas & Oil Journal, vol. 47, Jan. 13, 1949, pages 78 and 79.

Houdriflow, "Catalytic Cracking," Gas & Oil Journal, vol. 49, March 29, 1951, pages 180–181.